US009275441B2

(12) United States Patent
Marcelpoil et al.

(10) Patent No.: US 9,275,441 B2
(45) Date of Patent: Mar. 1, 2016

(54) METHOD FOR PREPARING QUANTITATIVE VIDEO-MICROSCOPY AND ASSOCIATED SYSTEM

(75) Inventors: Raphael Rodolphe Marcelpoil, Corenc (FR); Cedrick Rene Orny, Grenoble (FR)

(73) Assignee: TriPath Imaging, Inc., Burlington, NC (US)

( * ) Notice: Subject to any disclaimer, the term of this patent is extended or adjusted under 35 U.S.C. 154(b) by 450 days.

(21) Appl. No.: 13/444,417

(22) Filed: Apr. 11, 2012

(65) Prior Publication Data
US 2012/0262563 A1 Oct. 18, 2012

Related U.S. Application Data

(60) Provisional application No. 61/474,514, filed on Apr. 12, 2011.

(51) Int. Cl.
*H04N 17/00* (2006.01)
*H04N 7/18* (2006.01)
(Continued)

(52) U.S. Cl.
CPC ............... *G06T 5/006* (2013.01); *G06T 7/0028* (2013.01); *G06T 2207/10056* (2013.01);
(Continued)

(58) Field of Classification Search
CPC .. G02B 21/365; G02B 21/367; G02B 21/361; G02B 21/16; G02B 21/06; G02B 21/36; G02B 21/00; G02B 21/008; G02B 21/26; G02B 21/0016; G02B 21/244; G02B 21/34; G02B 21/362; G02B 21/002; G02B 21/0032; G02B 21/14; G02B 21/0012; G02B 21/082
USPC .......................................................... 348/79
See application file for complete search history.

(56) References Cited

U.S. PATENT DOCUMENTS 4,950,880 A * 8/1990 Hayner .................. G01S 7/497
250/201.9
5,832,110 A 11/1998 Hull
(Continued)

FOREIGN PATENT DOCUMENTS

EP        1 975 875 A2     10/2008
JP      2002539497 A       11/2002
(Continued)

OTHER PUBLICATIONS

Mateos, G., et al., "A Camera Calibration Technique Using Targets of Circular Features," *Proceedings of the 5th Iberoamerican Symposium on Pattern Recognition (SIARP)*, 2000, 12 pages; http://citeseerx.ist.psu.edu/viewdoc/download?doi=10.1.1.14.1965&rep=rep1&type=pdf.
(Continued)

*Primary Examiner* — Tracy Li
*Assistant Examiner* — Mohammad J Rahman
(74) *Attorney, Agent, or Firm* — Lerner, David, Littenberg, Krumholz & Mentlik, LLP

(57) ABSTRACT

Embodiments of the present invention are directed to a method for calibrating an imaging system for analyzing a plurality of molecular species in a sample. According to one embodiment, the method comprises acquiring a plurality of images of the sample with an image acquisition device at a plurality of different wavelengths, comparing a region of interest associated with at least one of the images acquired at one respective wavelength to a region of interest associated with at least one of the images acquired at a different wavelength, and aligning the plurality of images such that the region of interest associated with at least one of the images acquired at one respective wavelength corresponds to the region of interest associated with the at least one of the images acquired at a different wavelength.

36 Claims, 7 Drawing Sheets

(51) Int. Cl.
*G06T 5/00* (2006.01)
*G06T 7/00* (2006.01)

(52) U.S. Cl.
CPC .............. *G06T 2207/10152* (2013.01); *G06T 2207/20068* (2013.01); *G06T 2207/30024* (2013.01); *G06T 2207/30208* (2013.01)

(56) References Cited

U.S. PATENT DOCUMENTS

| | | | |
|---|---|---|---|
| 6,219,446 | B1 | 4/2001 | Kiriki et al. |
| 7,065,236 | B2 | 6/2006 | Marcelpoil et al. |
| 7,133,547 | B2 | 11/2006 | Marcelpoil et al. |
| 7,443,508 | B1 * | 10/2008 | Vrhel ................. G01J 3/10 348/195 |
| 7,602,954 | B2 | 10/2009 | Marcelpoil et al. |
| 7,826,650 | B2 | 11/2010 | Marcelpoil et al. |
| 7,989,209 | B2 | 8/2011 | Marcelpoil et al. |
| 2002/0150909 | A1 * | 10/2002 | Stuelpnagel et al. ............ 435/6 |
| 2003/0071128 | A1 * | 4/2003 | Tsikos et al. ............... 235/470 |
| 2003/0080190 | A1 * | 5/2003 | Tsikos et al. ............ 235/462.01 |
| 2003/0085281 | A1 * | 5/2003 | Knowles et al. ............. 235/454 |
| 2003/0091221 | A1 * | 5/2003 | Marcelpoil et al. .......... 382/128 |
| 2003/0098353 | A1 * | 5/2003 | Tsikos et al. ............ 235/472.01 |
| 2003/0102379 | A1 * | 6/2003 | Tsikos et al. ............ 235/462.45 |
| 2003/0215157 | A1 | 11/2003 | Chao et al. |
| 2003/0218070 | A1 * | 11/2003 | Tsikos et al. ............ 235/472.01 |
| 2004/0114218 | A1 | 6/2004 | Karlsson et al. |
| 2005/0059681 | A1 * | 3/2005 | Cremer ............ G01N 21/6428 514/260.1 |
| 2005/0283065 | A1 * | 12/2005 | Babayoff .................... 600/407 |
| 2006/0041384 | A1 * | 2/2006 | Kermani et al. ............... 702/19 |
| 2006/0086794 | A1 * | 4/2006 | Knowles et al. ............. 235/454 |
| 2007/0026525 | A1 | 2/2007 | Marcelpoil et al. |
| 2007/0274714 | A1 * | 11/2007 | Achal et al. .................... 398/43 |
| 2009/0075391 | A1 * | 3/2009 | Fulghum, Jr. ................ 436/164 |
| 2009/0295963 | A1 * | 12/2009 | Bamford et al. ............. 348/302 |
| 2009/0296207 | A1 * | 12/2009 | Goelles ............... G02B 21/008 359/385 |
| 2010/0039539 | A1 | 2/2010 | Kinoshita |
| 2010/0054574 | A1 | 3/2010 | Marcelpoil et al. |
| 2010/0061618 | A1 | 3/2010 | Marcelpoil et al. |
| 2010/0067775 | A1 | 3/2010 | Marcelpoil et al. |
| 2012/0200682 | A1 * | 8/2012 | Mestha et al. .................. 348/61 |
| 2012/0250025 | A1 * | 10/2012 | Moshe ................. B07C 5/3422 356/451 |
| 2012/0300998 | A1 * | 11/2012 | Ioudovski et al. ............ 382/128 |
| 2012/0327248 | A1 * | 12/2012 | Tack ......................... G01J 3/26 348/164 |
| 2013/0110400 | A1 * | 5/2013 | Moshe .................... G01N 1/26 702/3 |

FOREIGN PATENT DOCUMENTS

| | | |
|---|---|---|
| JP | 2010-078611 A | 4/2010 |
| JP | 2010078611 A | 4/2010 |
| JP | 2010249739 A | 11/2010 |
| WO | 0055667 A1 | 9/2000 |
| WO | WO 03/025554 A2 | 3/2003 |
| WO | WO 03/062803 A2 | 7/2003 |

OTHER PUBLICATIONS

Waizenegger, W., et al., "Calibration of a Synchronized Multi-Camera Setup for 3D Videoconferencing," *3DTV-Conference: The True Vision—Capture, Transmission and Display of 3D Video (3DTV-CON)*, 2010, pp. 1-4.

Office Action from Japanese Patent Application No. 2014-505242 mailed Nov. 6, 2014.

* cited by examiner

METHOD FOR PREPARING QUANTITATIVE VIDEO-MICROSCOPY AND ASSOCIATED SYSTEM

FIELD OF THE INVENTION

The present invention relates to image analysis and, more particularly, to a method for calibrating or otherwise preparing a video-microscopy system for quantitative video-microscopy in cellular biology and pathology applications and an associated system and a non-transitory computer-readable medium encoded with a computer software program product therefore.

BACKGROUND OF THE INVENTION

Effective analysis of microscopic images is essential in cellular biology and pathology, particularly for detection and quantification of genetic materials such as, for example, genes or messenger RNA, or the expression of this genetic information in the form of proteins such as through, for example, gene amplification, gene deletion, gene mutation, messenger RNA molecule quantification, or protein expression analyses. Gene amplification is the presence of too many copies of the same gene in one cell, wherein a cell usually contains two copies, otherwise known as alleles, of the same gene. Gene deletion indicates that less than two copies of a gene can be found in a cell. Gene mutation indicates the presence of incomplete or non-functional genes. Messenger RNAs (mRNA) are molecules of genetic information, synthesized from a gene reading process, that serve as templates for protein synthesis. Protein expression is the production of a given protein by a cell. If the gene coding for the given protein, determined from a protein expression process, is enhanced or excess copies of the gene or mRNA are present, the protein may be over-expressed. Conversely, if the gene coding is suppressed or absent, the protein may be under-expressed or absent.

Normal cellular behaviors are precisely controlled by molecular mechanisms involving a large number of proteins, mRNAs, and genes. Gene amplification, gene deletion, and gene mutation are known to have a prominent role in abnormal cellular behaviors through abnormal protein expression. The range of cellular behaviors of concern includes behaviors as diverse as, for example, proliferation or differentiation regulation. Therefore, effective detection and quantification in gene amplification, deletion and mutation, mRNA quantification, or protein expression analyses is necessary in order to facilitate useful research, diagnostic and prognostic tools.

There are numerous laboratory techniques directed to detection and quantification in gene amplification, deletion and mutation, mRNA quantification, or protein expression analyses. For example, such techniques include Western, Northern and Southern blots, polymerase chain reaction ("PCR"), enzyme-linked immunoseparation assay ("ELISA"), and comparative genomic hybridization ("CGH") techniques. However, microscopy is routinely utilized because it is an informative technique, allowing rapid investigations at the cellular and sub-cellular levels while capable of being expeditiously implemented at a relatively low cost.

When microscopy is the chosen laboratory technique, the biological samples must first undergo specific detection and revelation preparations. Once the samples are prepared, a human expert typically analyzes the samples with a microscope alone in a qualitative study, or with a microscope coupled to a camera and a computer in a quantitative and generally standardized study. In some instances, the microscope may be configured for fully automatic analysis, wherein the microscope is automated with a motorized stage and focus, motorized objective changers, automatic light intensity controls and the like.

The preparation of the samples for detection may involve different types of preparation techniques that are suited to microscopic imaging analysis, such as, for example, hybridization-based and immunolabeling-based preparation techniques. Such detection techniques may be coupled with appropriate revelation techniques, such as, for example, fluorescence-based and visible color reaction-based techniques.

In Situ Hybridization ("ISH") and Fluorescent In Situ Hybridization ("FISH") are detection and revelation techniques used, for example, for detection and quantification in genetic information amplification and mutation analyses. Both ISH and FISH can be applied to histological or cytological samples. These techniques use specific complementary probes for recognizing corresponding precise sequences. Depending on the technique used, the specific probe may include a chemical (ISH) marker or a fluorescent (FISH) marker, wherein the samples are then analyzed using a transmission microscope or a fluorescence microscope, respectively. The use of a chemical marker or a fluorescent marker depends on the goal of the user, each type of marker having corresponding advantages over the other in particular instances.

In protein expression analyses, immunohistochemistry ("IHC") and immunocytochemistry ("ICC") techniques, for example, may be used. IHC is the application of immunochemistry to tissue sections, whereas ICC is the application of immunochemistry to cultured cells or tissue imprints after they have undergone specific cytological preparations such as, for example, liquid-based preparations. Immunochemistry is a family of techniques based on the use of a specific antibody, wherein antibodies are used to specifically target molecules inside or on the surface of cells. The antibody typically contains a marker that will undergo a biochemical reaction, and thereby experience a change color, upon encountering the targeted molecules. In some instances, signal amplification may be integrated into the particular protocol, wherein a secondary antibody, that includes the marker stain, follows the application of a primary specific antibody.

In both hybridization and immunolabeling studies, chromogens of different colors are used to distinguish among the different markers. However, the maximum number of markers that may be used in a study is restricted by several factors. For example, the spectral overlapping of the colors used to reveal the respective markers may be a limiting factor because dyes may absorb throughout a large portion of the visible spectrum. Accordingly, the higher the number of dyes involved in a study, the higher the risk of spectral overlapping. Further, the spectral resolution of the acquisition device may be a limiting factor and the minimal color shift that the device is able to detect must be considered.

In addition, immunochemistry, as well as chemistry in ISH, are generally considered to exhibit poor sensitivity when quantification of a marker must be achieved. However, the quantification accuracy of these techniques may be dependent upon several factors. For instance, the type of reaction used may play a role in the accuracy of the technique since the linearity of the relationship between ligand concentration and the degree of the immunochemical staining reaction may strongly depend on the reaction type. More particularly, for example, a peroxidase/anti-peroxidase method may be more linear than a biotin-avidin method. The cellular localization of the markers may also affect accuracy where, for example, if membrane and nuclear markers spatially overlap, the resulting color is a mixture of the respective colors. Accordingly, since the corresponding quantification is subjective, the accuracy of the determination may be affected. In addition, a calibration standard such as, for example, cells with known features, gels with given concentrations of the marker, or the like, may be required where a developed analysis model is applied to a new and different case. Staining kits are generally available which incorporate calibration standards. However, the calibration standard is usually only applicable to a particular specimen, such as a specific cell or a structure of a specific type which is known to exhibit constant features with respect to the standard, and may be of limited utility when applied to a sample of a different nature.

Overall, the described "colorimetric" studies present sample analysis information in color and facilitate processing and quantification of the information to thereby help to provide a diagnosis or to form a prognosis of the particular case. For illustration, the detection and quantification of the HER2 protein expression and/or gene amplification may be assessed by different approaches used in quantitative microscopy. HER2 is a membrane protein that has been shown to have a diagnostic and prognostic significance in metastatic breast cancer. Because HER2 positive patients were shown to be more sensitive to treatments including Herceptin® (a target treatment developed by Genentech), the definition of the HER2 status of metastatic breast cancers has been proven to be of first importance in the choice of the appropriate treatment protocol. This definition of the HER2 status was based on a study of samples treated with either hybridization (FISH, ISH) or immunolabeling (IHC) techniques.

In such studies, using FISH with, for example, an FDA approved kit such as PathVysion® produced by Vysis, requires an image analysis protocol for counting the number of copies of the HER2 gene present in every cell. In a normal case, two copies of the gene are found in each cell, whereas more than three copies of the gene in a cell indicate that the gene is amplified. Alternatively, using IHC with, for example, an FDA approved kit such as Herceptest® produced by Dako, requires an image analysis protocol that classified the cases into four categories depending on the intensity and localization of the HER2 specific membrane staining Current studies tend to show that these two investigation techniques (hybridization and immunolabeling) may be complementary and may help pathologists in tumor sub-type diagnosis when combined.

However, such colorimetry studies require extensive sample preparation and procedure control. Thus, when disposing of adapted staining protocols, it is critical to be able to verify that the staining for each sample matches the particular model used in the image acquisition and processing device such that useful and accurate results are obtained from the gathered information. Otherwise, the analysis may have to be repeated, starting again from the sample preparation stage, thereby possibly resulting in a costly and time-consuming process.

In a typical microscopy device based on image acquisition and processing, the magnified image of the sample must first be captured and digitized with a camera. Generally, charge coupled device (CCD) digital cameras are used in either light or fluorescence quantitative microscopy. Excluding spectrophotometers, one technique used to perform colorimetric microscopy studies includes the use of a black and white (BW) CCD camera. In such an instance, a gray level image of the sample is obtained, corresponding to a monochromatic light having a wavelength specific to the staining of the sample to be analyzed. The specific wavelength of light is obtained either by filtering a white source light via a specific narrow bandwidth filter, or by directly controlling the wavelength of the light source, using either manual or electronic controls. Images of the sample, showing the spectral response of the sample at different wavelengths, are individually captured in sequential order to facilitate the analysis. When multiple scenes or fields of view are analyzed, the typical protocol is to automate the sequence in a batch mode to conserve processing time. However, when multiple scenes, fields of view, or regions of interest are analyzed, the scene, field of view, or region of interest examined in one image acquired under one particular wavelength must correspond to a scene, field of view, or region of interested examined in a separate image acquired under a different wavelength to ensure accurate analysis of the scene, field of view, or region of interest. Furthermore, images acquired under different wavelengths must be corrected for different magnification factors produced by chromatic aberrations.

Accordingly, techniques used in colorimetric analyses of prepared samples are of limited use in the detection and quantification of species of interest due to several factors such as, for example, spectral overlapping, mixing of colors due to spatially overlapping of membrane, cytoplasmic, and nuclear markers, chromatic aberrations in the optical path, limited spectral resolution of the acquisition device, calibration particularities, subjectivity of the detection and quantification process, and inconsistencies between human operators. The image processing portion of colorimetric analysis techniques has historically been directed to the subjective detection of contrast within the prepared sample or to a complex and voluminous analysis of the sample at various specific wavelengths of light using a combination of light sources and filters. Therefore, there exists a need for preparing imaging systems to provide accurate comparisons between multiple images, scenes, fields of view and/or regions of interest in order to generate high quality data, comprising the necessary analysis information about the sample, while reducing subjectivity and inconsistency in the sample analysis.

SUMMARY OF EMBODIMENTS OF THE INVENTION

The above and other needs are met by the present invention which, in one embodiment, provides a method for calibrating an imaging system for analyzing a plurality of molecular species in a sample. The method generally includes acquiring a plurality of images of the sample with an image acquisition device, such as a camera in a video-microscopy system, at a plurality of different wavelengths. The method includes comparing a region of interest associated with at least one of the images acquired at one respective wavelength to a region of interest association with at least one of the images acquired at a different wavelength. Further, the method includes aligning the plurality of images such that the region of interest associated with at least one of the images acquired at one respective wavelength corresponds to the region of interest associated with the at least one of the images acquired at the different wavelength.

According to one embodiment of the invention, the method may further include determining a magnification factor for each of a plurality of wavelengths from a reference image, wherein the magnification factor characterizes the difference in magnification between one image taken with respect to one wavelength and another image taken with respect to a different wavelength. Determining the magnification factor may comprise capturing a defocused image of a calibration slide in each of the plurality of wavelengths. Such a calibration slide may include a lattice of a plurality of cells arranged in an alternating pattern, each cell further comprising a plurality of pixels. According to one technique, the defocused image is captured by applying a low pass filter to a focused image of the calibration slide. In another embodiment, the defocused image may be captured by adjusting the focus plane in the positive or negative z-axis.

In one aspect, the method may further include determining a shading of each of the plurality of pixels so as to form an image mask that discriminates between a percentage of pixels having the lightest shading and a percentage of pixels having the darkest shading. In one embodiment, the percentage of pixels having the darkest and lightest shading is equivalent, and may each be about 25%. In addition, the method may include determining an area and the center for each of the plurality of cells, measuring the distance between the centers of each of the plurality of cells, and refining the measurements of the areas for each of the plurality of the cells and the distances between the centers of each of the plurality of cells.

The distance between the centers of each of the plurality of cells may be measured by averaging the distances measured between the centers of each of the plurality of cells and the centers of each of the plurality of cells' cardinal neighboring cells in the north, east, south, and west directions. Furthermore, the distance between the centers of each of the plurality of cells may be refined by excluding distances from the mean calculation that fall outside a confidence interval from the mean calculation. Likewise, the measurements for the areas of the plurality of cells may be refined by excluding the areas from the mean calculation that fall outside a confidence interval from the mean calculation.

Furthermore, the magnification factor measurements may be refined by displacing the calibration slide in a random or otherwise not established in advance direction a plurality of times, capturing a defocused image for each of the times the calibration slide is displaced, determining a shading of each of the plurality of pixels in each of the displaced calibration slides so as to form a mask for discriminating between a percentage of the pixels having the lightest shading and an equal percentage of the pixels having the darkest shading, determining an area for each of the plurality of cells in each of the calibration slides, determining a center for each of the plurality of cells in the displaced calibration slides, measuring the distances between the centers of each of the plurality of cells in each of the displaced calibration slides, and refining the measurements for the areas of each of the plurality of cells in each of the displaced calibration slides and the measurements of distances between the centers of each of the plurality of cells in each of the displaced calibration slides.

In one embodiment of the present invention, acquiring the plurality of images of the sample includes scanning the image at a plurality of different wavelengths. Each scan produces a displacement factor in a first direction and a second direction. The displacement factor defines the difference in displacement between a region of interest of an image taken with respect to one wavelength and a region of interest of an image taken with respect to a second wavelength.

According to one embodiment, comparing a region of interest associated with at least one of the images acquired at one respective wavelength to a region of interest associated with at least one of the images acquired at a different wavelength further comprises applying a low-pass filter to each of the plurality of images, determining a plurality of histograms of an optical density in each of the images, binarizing the plurality of images according to a threshold from each of the respective histograms so as to form an image mask for discriminating between negative and positive regions in each of the images, determining a plurality of profile areas for each of the images from each respective binarized image mask, the plurality of profile areas configured to at least represent the region of interest selected for comparison, rescaling the coordinates of the plurality of profile areas according to a spline function, and determining a shift between the plurality of images with respect to a reference image.

In one embodiment, applying the low pass filter may comprise applying a low pass filter on the image with a kernel comprising a square matrix (i.e., X•X matrix) having an equal number of rows and a number of columns, such as a 3×3 matrix, with elements having a value equal to about the inverse of the product of the total number of rows and the total number of columns (i.e., $1/X^2$), such as a value of ⅑ for a 3×3 matrix. Furthermore, the threshold formed from each of the respective histograms may comprise a value defined by the mode and standard deviations of the optical densities of each of the plurality of pixels of the respective histograms. Furthermore, the profiles areas may be oriented in a horizontal and vertical fashion with respect to each of the plurality of images, wherein each image further comprises a region of interest. The horizontal profile area width may be defined in part by a horizontal displacement factor, and the number of horizontal profiles may be defined in part by a vertical displacement factor. The vertical profile area height may be defined in part by the horizontal displacement factor and the number of vertical profile areas may be defined in part by the horizontal displacement factor.

Another embodiment of the present invention includes rescaling the horizontal coordinates of the horizontal and vertical profile areas from coordinates measured in pixels to coordinates measured by the distance between a center reference pixel position and each of the corresponding horizontal pixel positions. In one embodiment, the distance may be measured in micrometers. The vertical coordinates of the horizontal and vertical profile areas may be rescaled to relate to an average optical intensity at a particular horizontal coordinate position and the related wavelength of the image. Further, embodiments of the present invention may further comprise determining a shift between the plurality of images by determining the difference in displacement between the rescaled horizontal and vertical profile areas of a reference image to the rescaled horizontal and vertical profile areas of a target image. In addition, aligning the plurality of images may further comprise rescaling the plurality of images by a respective magnification factor and shifting the images in a horizontal and vertical direction so as to align the rescaled horizontal and vertical profile areas of each of the images with the rescaled horizontal and vertical profile areas of the reference image.

Another advantageous aspect of the present invention comprises determining an amount of molecular specie, as indicated by a respective dye, for each pixel at each corresponding pixel location in the plurality of images, the plurality of images being aligned with respect to one another. Additionally, the present invention may comprise an imaging system for analyzing an amount of a plurality of molecular species in a sample, the system comprising an image acquisition device configured to acquire a plurality of images of the sample at different wavelengths, and a processor device in communication with the image acquisition device. The processor device may be configured to compare a region of interest associated with at least one of the images acquired at one respective wavelength to a region of interest associated with at least one of the images acquired at a different wavelength and to align the plurality of images captured by the imaging system such that the region of interest associated with at least one of the images acquired at one respective wavelength corresponds to the region of interest associated with the at least one of the images acquired at the different wavelength.

In one embodiment, the image acquisition device may be further configured to acquire the plurality of images by scanning the images, each scan producing a displacement factor in a first and a second direction, the displacement factor defining the difference in displacement between a region of interest of an image taken with respect to one wavelength and a region of interest of an image taken with respect to a different wavelength. The processor device may be configured to determine an amount of molecular species, as indicated by a respective dye, for each pixel in the plurality of images. Further, the processor device may be configured to determine a magnification factor for each of the plurality of images taken with wavelengths which are different from a reference image wavelength. In another embodiment, the image acquisition device may comprise a black and white camera and may comprise a plurality of filters, each filter corresponding to a different wavelength representative of a respective dye in the sample.

Still another advantageous aspect of the present invention comprises a non-transitory computer-readable medium encoded with a computer software program product configured to be executable on a computer device for calibrating an imaging system for determining an amount of a plurality of molecular species in a sample. The non-transitory computer-readable medium encoded with a computer program product comprises an executable portion for acquiring a plurality of images of the sample with an image acquisition device at a plurality of different wavelengths, an executable portion for comparing a region of interest associated with at least one of the images acquired at one respective wavelength to a region of interest associated with at least one of the images acquired at a different wavelength, and an executable portion for aligning the plurality of images such that the region of interest associated with at least one of the images acquired at one respective wavelength corresponds to a region of interest associated with at least one of the images acquired at the different wavelength.

Thus, embodiments of the present invention comprise a calibration technique for preparing an imaging system to provide accurate comparisons between multiple images, scenes, fields of view, and/or regions of interest in order to generate high quality data, comprising the necessary information about the sample, while reducing the subjectivity and inconsistency in the sample analysis. Embodiments of the present invention may further provide an apparatus and a computer program product for preparing an imaging system to provide accurate comparisons between multiple images, scenes, fields of view, and/or regions of interest in order to generate high quality data for sample analysis.

BRIEF DESCRIPTION OF THE DRAWINGS

Figure 1:
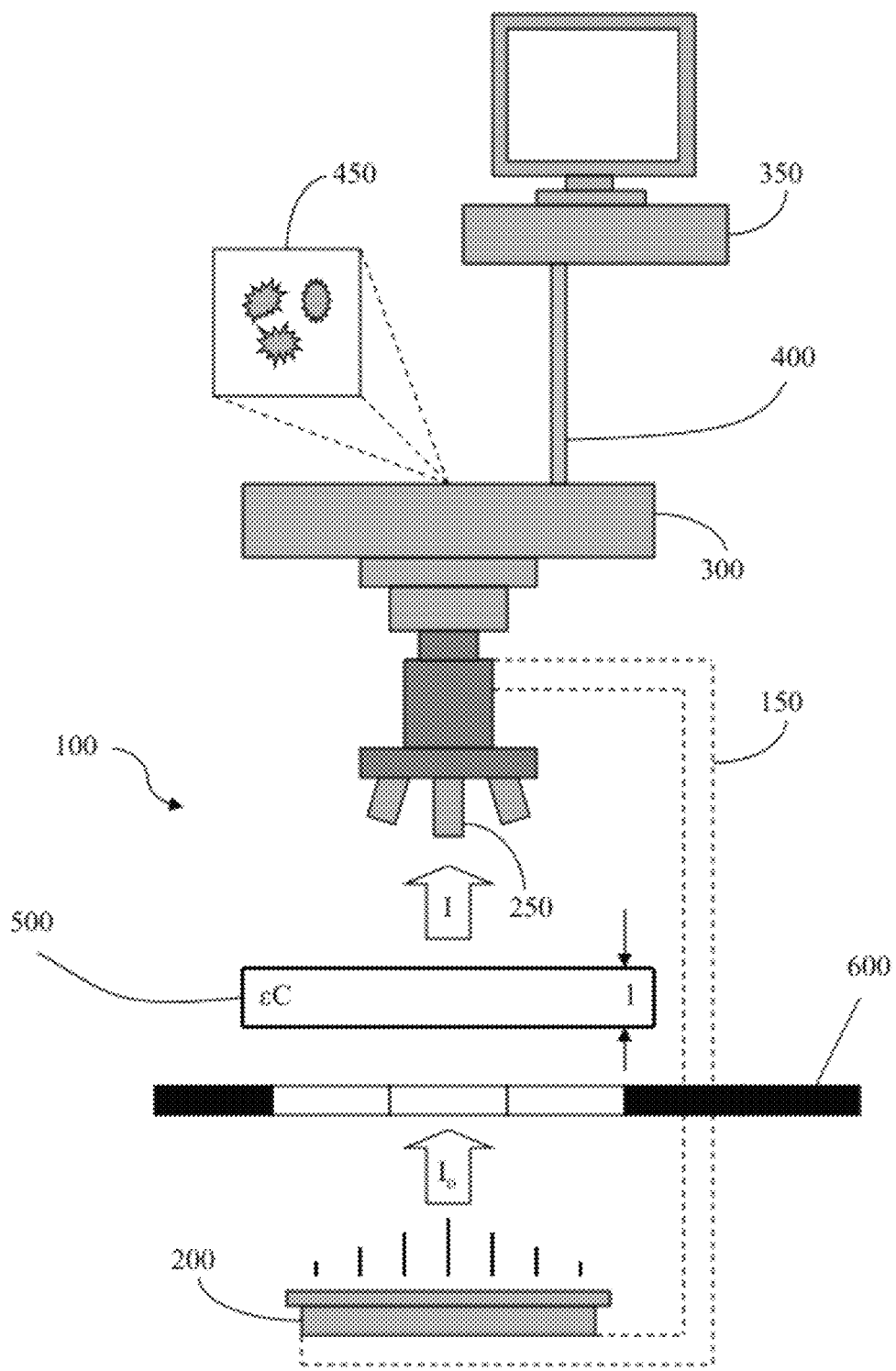
Figure 2:
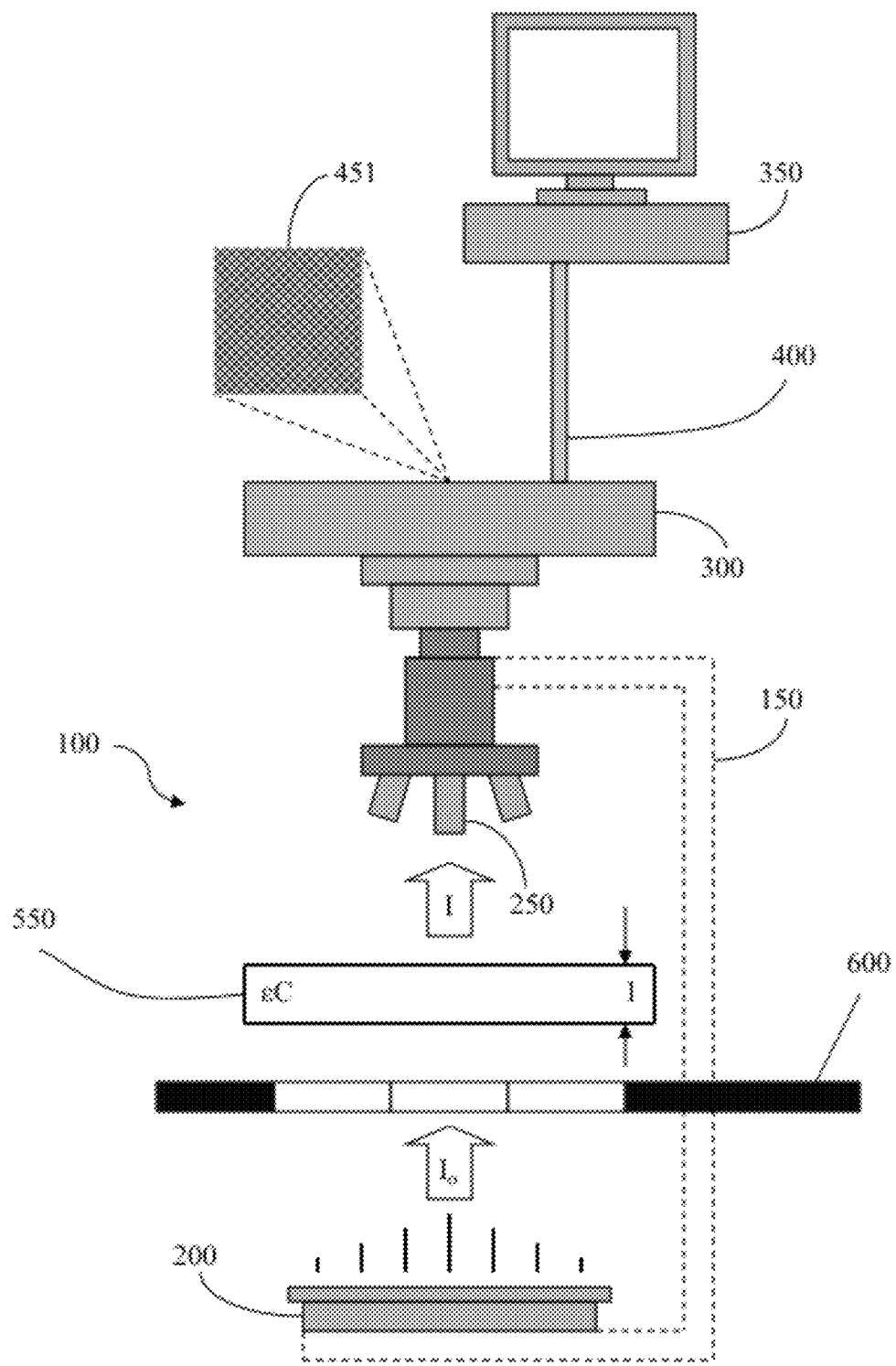
Figure 3:
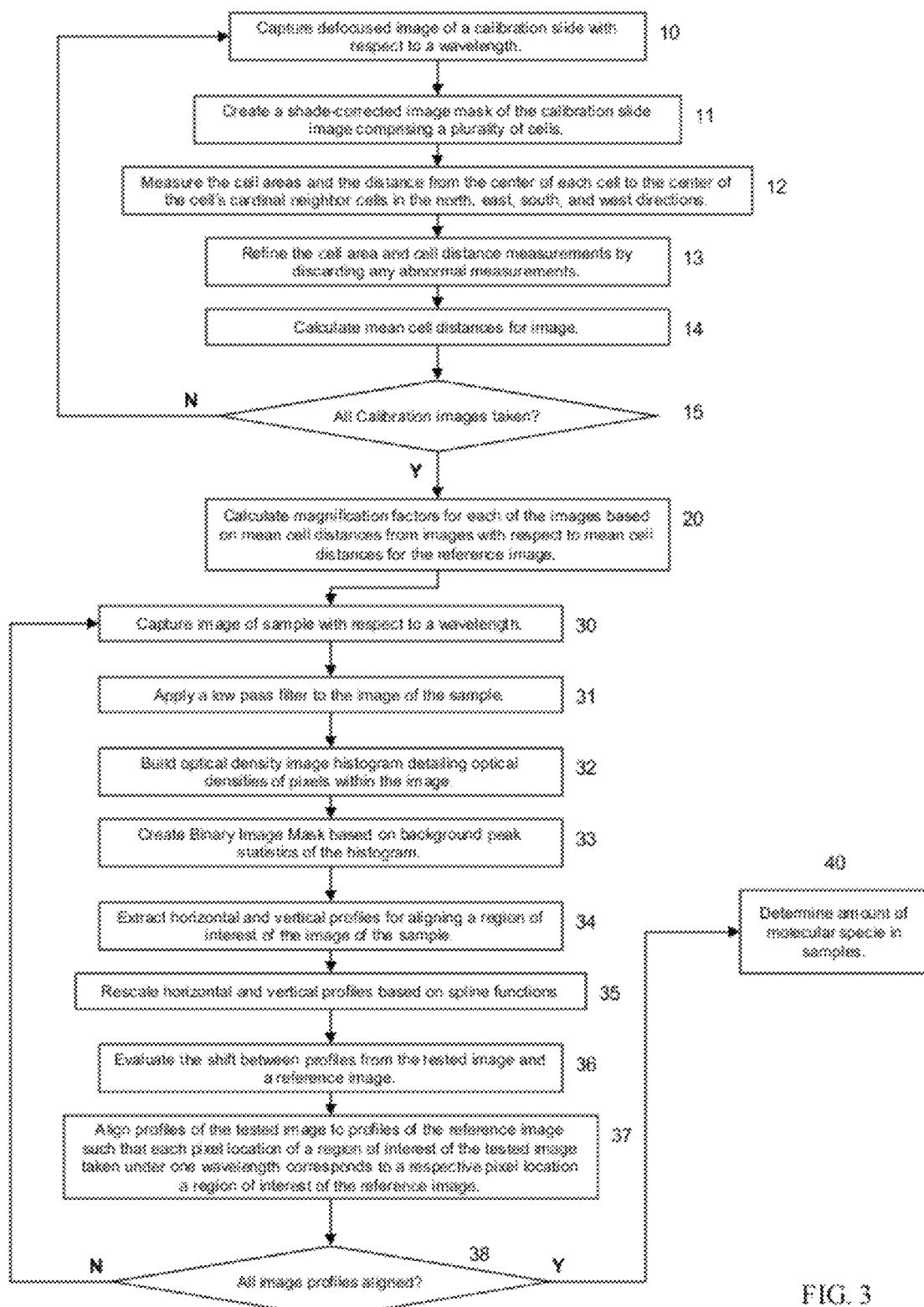
Figure 4:
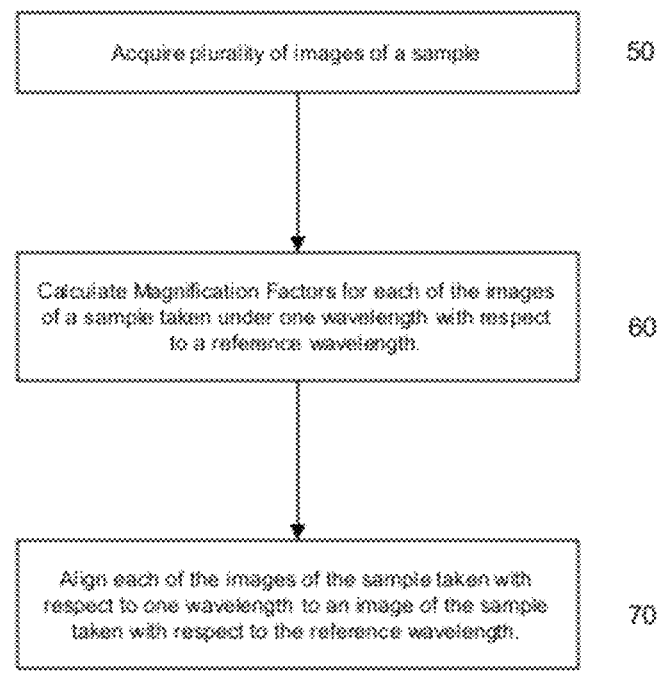
Figure 5:
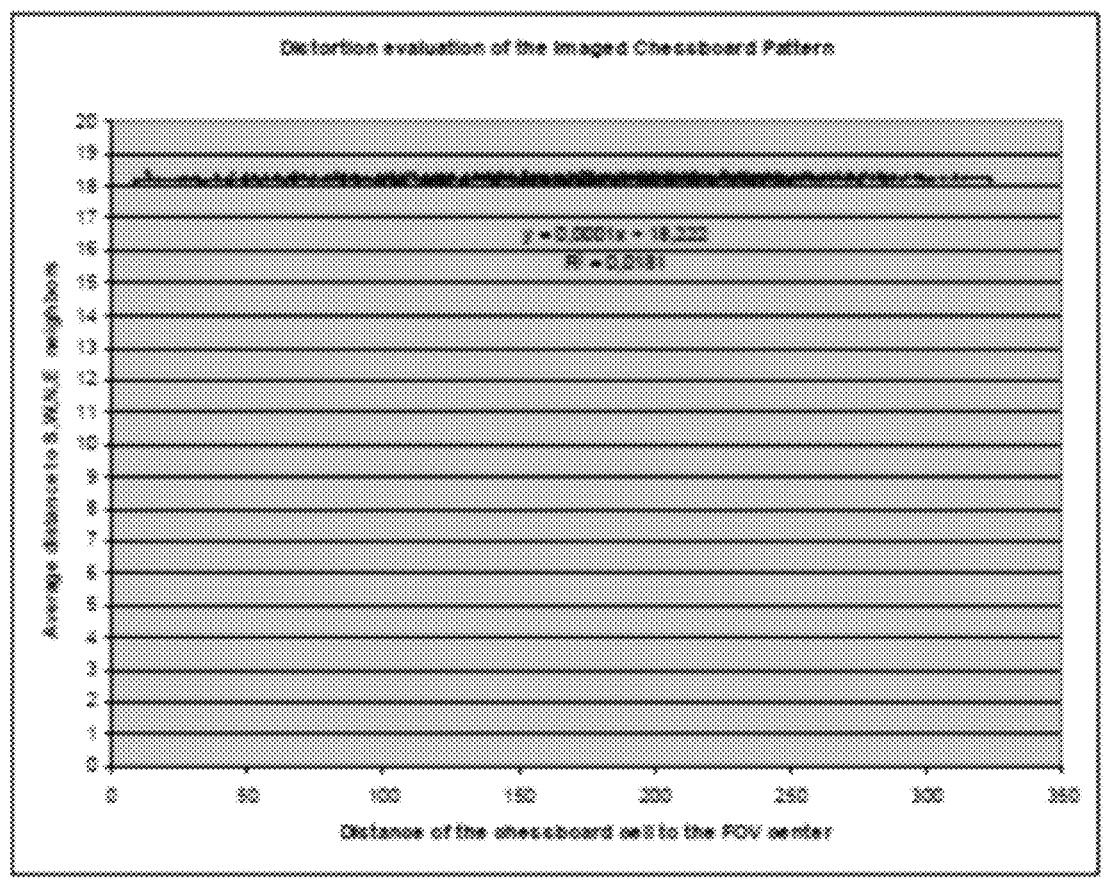
Figure 6:
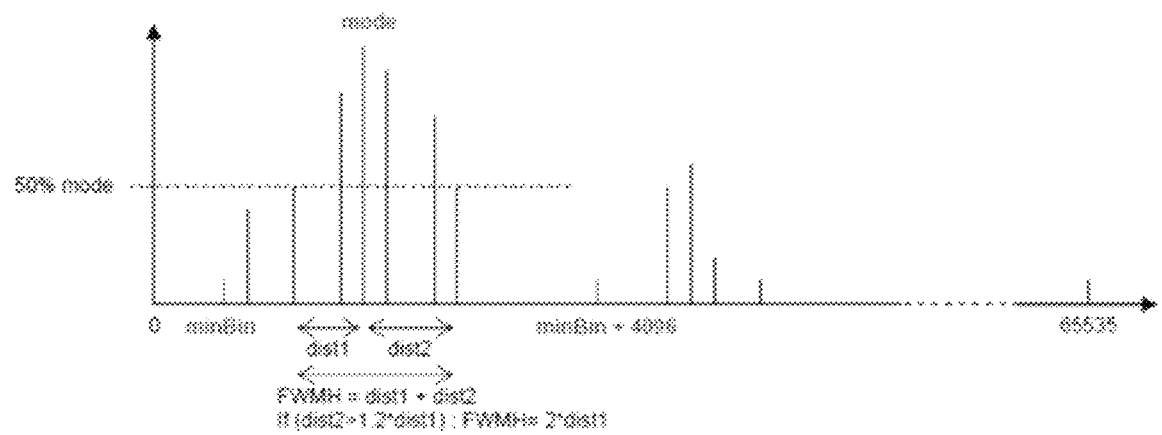
Figure 7:
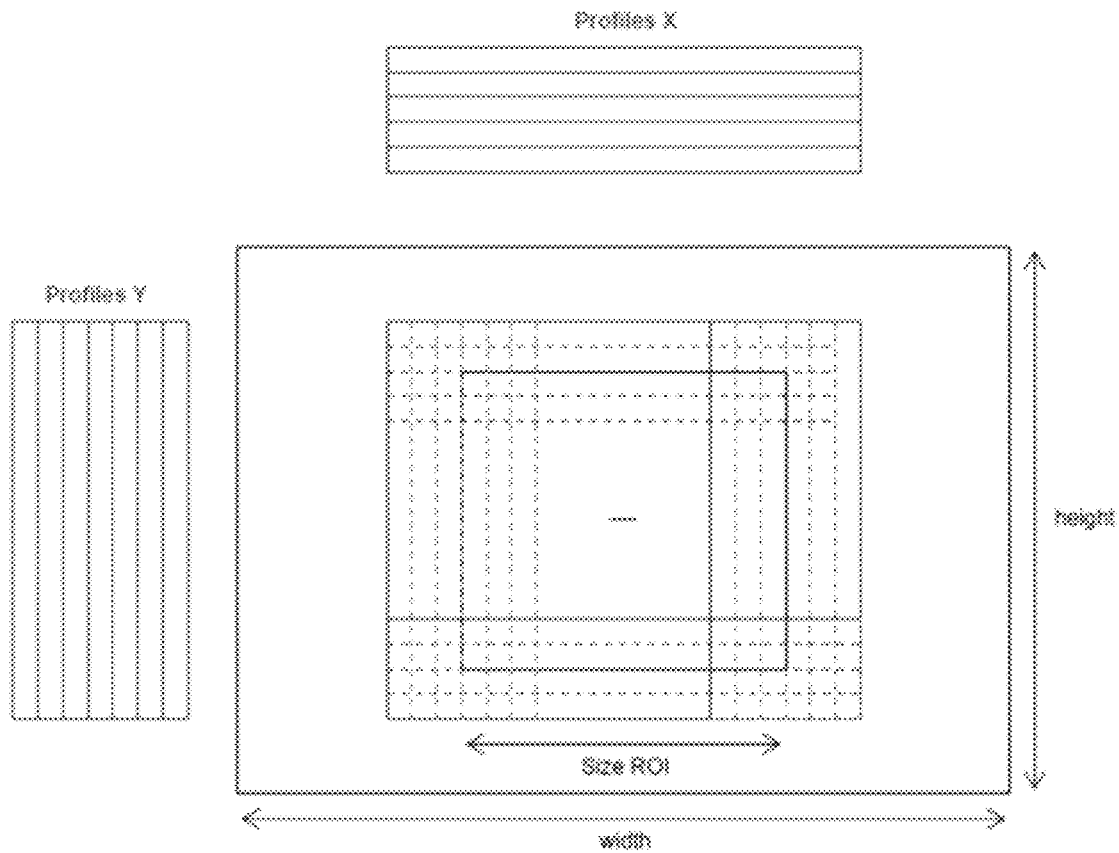

Having thus described the invention in general terms, reference will now be made to the accompanying drawings, which are not necessarily drawn to scale, and wherein:

FIG. 1 is a general schematic representation of a quantitative video-microscopy system according to one embodiment of the present invention;

FIG. 2 is a general schematic representation of a quantitative video-microscopy system according to one embodiment of the present invention;

FIG. 3 is a flowchart for calibrating a video-microscopy system according to one embodiment of the present invention;

FIG. 4 is a flowchart for calibrating a video-microscopy system according to one embodiment of the present invention;

FIG. 5 is a scatter plot illustrating a distortion evaluation of an image taken from a video-microscopy system according to one embodiment of the present invention;

FIG. 6 is a histogram illustrating optical density statistics of a plurality of pixels in a image of a sample taken from a video-microscopy system according to one embodiment of the present invention; and FIG. 7 is an illustration of a region of interest of a slide comprising vertical and horizontal profile areas.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the present invention are generally directed to systems and methods for calibrating or otherwise preparing a video-microscopy system, wherein the system may be configured to determine an amount (e.g., concentration) of a plurality of molecular specie in a sample, the molecular specie being indicated by a dye. The amount of the molecular specie is determined by analyzing images of the sample that are captured using an image acquisition device, such as a camera or a scanner, in a video-microscopy system. According to one embodiment of the invention, the system may be configured so as to be capable of detecting one or more particular dyes, each dye corresponding to a particular spectral signature, so as to determine the amount of a molecular specie in each pixel at each pixel location in the images. In one embodiment, the video-microscopy system is prepared prior to determining the amount of a molecular specie in each pixel at each pixel location in the images. Thus, embodiments of the present invention may provide advantages over the prior art, such as reducing errors in the estimations of the dye concentrations estimations due to improper calibration or inaccurate comparisons of each pixel at each pixel location in the plurality of images.

According to one embodiment of the present invention, the analysis of the sample may be used to quantify melastatin staining in both normal melanocyte nuclei (melanocytes from the basal layer of epithelial cells), considered as reference nuclei, and abnormal melanocyte nuclei (melanocytes from tumor foci). The results of such a quantitative analysis indicate whether the gene is either downregulated or normally expressed in the abnormal nuclei. However, the efficiency of the quantitative analysis heavily depends upon the image analysis methodology, which must consider and perform segmentation of the melanocyte nuclei, as well as colorimetric analysis of the specific dyes used in the protocol.

A plurality of chromogens may be present in a histological or cytological sample such as, for example, one or more markers (e.g., Brown DAB or BCIP-NBT), one or more morphological counterstains (e.g., Nuclear Fast Red-NFR, Haematoxylin, Eosin, Light Green SF, Orange G), and one or more natural pigments (e.g., melanin) All of the chromogens are typically taken into account for analyzing the sample, and embodiments of the present invention provide techniques for analyzing the sample given each of the chromogens, on a per pixel basis, to quantify the amount of one or more molecular specie in the sample. For example, the cytological test based on Papanicolaou stain is a multichromatic staining procedure that would contain 4 different dyes: haematoxylin, Orange G, Eosin Y and Light Green SF.

The platform for the evaluation of biological samples via image analysis is increasingly shifting from a general-purpose image analyzer to a more, and often highly, specialized dedicated "pathology workstation." Such workstations are typically designed to facilitate routine work, often combining many of the tools needed to provide a pathologist with the necessary information to determine the best possible results. One example of such a workstation is illustrated in FIG. 1 as a quantitative video-microscopy system, indicated by the numeral 100, according to one embodiment of the present invention. The system 100 generally comprises a microscope 150 having a light source 200 and a magnifying objective 250, a plurality of filters 600, a camera 300, a computer device 350, and a data transmission link 400 between the camera 300 and the computer device 350. The microscope 150 may comprise, for example, an Axioplan (or Axiovert) microscope produced by ZEISS of Germany or a similar microscope having a bright field light source. The camera 300 operably engages the microscope 150 and, in one embodiment, comprises a black-and-white camera, such as, for instance the prosilica GE1910 from Allied Vision Technologies. Typically, such a camera 300 also includes an associated frame grabber (not shown) to facilitate image capture, both the camera 300 and associated frame grabber being referred to herein as the "camera 300" for convenience. In some instances, both camera 300 and microscope 150 may be replaced by, for example, a black-and-white linear flat scanner and a controlled illumination source. Note that, though different configurations of the necessary system 100 are contemplated by the present invention, the present invention will be described herein in terms of a camera 300 and associated microscope 150. Accordingly, one skilled in the art will understand and appreciate the capabilities and methodologies associated with these different configurations for accomplishing the present invention as detailed herein. Further, although the present embodiment is disclosed as a camera, it is understood that the camera may be any image acquisition device, such as a camera, scanner, or any device configured to capture a plurality of images. The image acquisition system is capable of capturing low and/or high resolution images at any desired magnification, various regions of interest, and within various fields of view that may correspond to all or a portion of the sample or the slide.

The camera 300 is generally configured to capture a plurality of images 450 of a sample 500 through the magnifying objective 250 (where a flat scanner is used, the image 450 is captured through internal lenses), wherein the images 450 may further comprise a digital image having corresponding image data (collectively referred to herein as "the image 450"). According to one embodiment, a calibration image 451 of a calibration slide 550 as shown in FIG. 2, captured by image acquisition system, may be used for preparing the microscopy system prior to analysis of samples placed on slides. The filters 600 filter light from light source 200, and during operation of the system 100, multiple images of the sample 500 are taken using different filters, the differing filters provided for by a filter wheel or other filtering device as known to those skilled in the art. According to one embodiment, each wavelength corresponds to a respective dye of interest that may be present in the images. In one embodiment, the filters employed may correspond to the wavelengths of 460 nm, 490 nm, 520 nm, 570 nm, and 630 nm. Accordingly, the images 450 are generally captured individually, wherein each image corresponds to an individual wavelength filtered image of the field of view. According to one embodiment of the present invention, the camera 300 is configured to capture a plurality of calibration images 455 of a calibration slide 550 corresponding to each of the plurality of filters, the filters corresponding to different spectral signatures. The data transmission link 400 is configured so as to be capable of transmitting the calibration image 455 to the computer device 350, wherein the computer device 350 is further configured to be capable of analyzing the calibration image 455 with respect to each of the wavelengths. One skilled in the art will appreciate the computer device 350 may be any sort of processor device or processing element configured to communicate with the image acquisition system and is further configured to analyze a plurality of images as described herein.

According to a particularly advantageous aspect of the present invention, the system 100 is configured to analyze the calibration images for preparing a video-microscopy system for quantitative video-microscopy in cellular biology and pathology applications in accordance with the Lambert-Beer law. The Lambert-Beer law generally describes a proportionality that can be observed between the concentration of molecules in a solution (the concentration of the "molecular specie" or the "sample") and the light intensity measured through the solution. The Lambert-Beer law is typically expressed as:

$$OD = \epsilon \cdot l \cdot C \quad (1)$$

where OD is the optical density of the solution, $\epsilon$ is a proportionality constant called the molar extinction or absorption coefficient, l is the thickness of the sample, and C is the concentration of the molecular specie. The absorption coefficient $\epsilon$ is specific to the molecular specie and is typically expressed in units of $L \cdot mol^{-1} \cdot cm^{-1}$.

This proportionality relationship defined by the Lambert-Beer law has been verified under the several conditions including, for example, monochromatic light illuminating the sample, low molecular concentration within the sample, generally no fluorescence or light response heterogeneity (negligible fluorescence and diffusion) of the sample, and lack of chemical photosensitivity of the sample. Further, another requirement for an analysis according to the Lambert-Beer law includes, for instance, correct Köhler illumination of the sample under the microscope. Köhler illumination is available with many modern microscopes, providing an even illumination of the sample in the image plane and allowing for effective contrast control. Köhler illumination is critical for certain processes such as, for example, densitometry analysis. Correct Köhler illumination is typically provided by, for example, a two-stage illuminating system for the microscope in which the source is imaged in the aperture of the sub-stage condenser by an auxiliary condenser. The sub-stage condenser, in turn, forms an image of the auxiliary condenser on the object. An iris diaphragm may also be placed at each condenser, wherein the first iris controls the area of the object to be illuminated, and the second iris varies the numerical aperture of the illuminating beam.

In order to accurately measure the concentration of given species imaged under a microscope, the measurements of the optical densities performed at different wavelengths must specifically correspond to the observed portion of the sample. Accordingly, one advantageous aspect of the present invention includes a method for determining a relative magnification of a given calibration slide, scene, or pattern imaged under different wavelengths in order to specifically correspond a pixel at a given pixel location of one observed portion of a sample under one wavelength to a pixel at the corresponding pixel location in the observed portion of the sample in one or more different wavelengths. The coordinates of the center of the magnifying objective 250 are determined with respect to the center of the electronic device or chip comprising the image-producing component of the camera 300. An observed magnification factor is then determined for each wavelength and compared to the magnification factor for an arbitrarily chosen wavelength. For example, a central wavelength would comprise the chosen wavelength to which the magnification factor for each of the other wavelengths would be compared. The image for each wavelength is then adjusted according to the determined relative magnification factor and the relative coordinates of the center of the magnifying objective 250.

According to one embodiment and with reference to FIG. 3, a calibration slide comprising a chessboard pattern image, such as a FocalPoint Calibration Plate, is captured (Block 10) by the camera 300 at different wavelengths. Specifically, the chessboard pattern may be captured as a defocused image by applying a low pass filter to a focused image of the chessboard pattern. In another embodiment, a defocused image of the chessboard pattern may be captured by directly capturing a defocused image of the chessboard pattern by adjusting the focus plane in a vertical direction, either above or below the best z-focus plane. After the defocused image is obtained, a histogram of the defocused image is obtained detailing, for example, the 25% darkest and 25% lightest pixels in the image.

Accordingly, the defocused image may be modified to display the 25% darkest pixels and the 25% lightest pixels, and the middle 50% pixels are discarded from the image to create an image mask (Block 11) of the defocused image comprising a lattice of cells, the cells containing, for example, the 25% darkest and 25% lightest pixels. Cells containing the darkest and lightest pixels that touch the border of the defocused image may also discarded and excluded from the subsequent calibration steps. Furthermore, the area of the cells of the image mask may be measured (Block 12), and the mean area size and the standard deviations may be computed. The cells having area sizes that fall outside of, for example, a 95% confidence interval are also discarded from the calibration process.

The coordinates for the center of gravity for each of the remaining cells comprising the lattice of the defocused image may then be calculated. The distance between the center coordinates of each cell and the center coordinates of each of the neighboring cells in different directions, such as the north, east, south, and west directions, may then be measured (Block 12). An initial average distance may then be computed, which averages the measured distances between each of the center coordinates of each of the cells and the center coordinates of each of the cells' neighboring cells. For a given cell, the average distance between the center coordinate of the cell and the center coordinates of cell's cardinal neighbors can be computed by the following equation, wherein $k_{NN_i}^{th}$ is the cell's $k_i^{th}$ cardinal neighbor.

$$\bar{d}_{i_{NN}} = \frac{1}{4} \sum_{CardinalNeighbors} d(i, k_{NN_i}^{th}) \quad (2)$$

In addition to the mean distance, the calibration process may also include determining the standard deviation such that those distances that fall outside of, for example, the 95% confidence interval are then discarded from lattice cell mean distance characterization (Block 13). Accordingly, any cell within the image mask not having, for instance, 4 valid distances to 4 valid cardinal neighbors in the north, east, south, and west directions are excluded from the computation of the mean and standard deviation of the cell lattice distances. From the remaining valid distances, the average cell lattice distance then provides a relative magnification factor for the observed scene (Block 14).

Another advantageous aspect of the present invention includes refining the magnification factor taken from a calibration slide, image, or pattern under each of the differing wavelengths. Once the average cell lattice distance is computed for a given calibration slide, image, or pattern under a specific wavelength, the calibration slide, image, or pattern may be displaced in a plurality of random directions or directions otherwise not established in advance, such as directions in both the x-axis and y-axis. The calibration slide may then be automatically focused in the z-axis focus plane, and the calibration process is repeated. According to one embodiment, repeating the calibration process may include obtaining a new defocused image, creating a new image mask, and calculating new average cell lattice distances for each of the newly displaced images. In one embodiment of the present invention, this magnification refining process is repeated a plurality of times, such as at least thirty times. Although the current embodiment includes a magnification refining process that is repeated at least thirty times, one skilled in the art will appreciate the invention may be repeated any number of times.

According to a further advantageous aspect of the present invention, the system also limits distortion, an aberration that can cause straight lines to curve near the edges of a captured image. This aberration causes the image to either curve in an outwardly fashion like a barrel or curve in an inwardly fashion like a pincushion. Distortion aberrations are problematic in video-microscopy systems as a pixel location in an image taken under one specific wavelength should correspond to the respective pixel location in each of the multiple images taken under differing wavelengths. As such, distortion aberrations may create inaccuracies when comparing images taken under differing wavelengths. Distortion aberrations can be determined by plotting the distances between the center coordinates of each cell and the center coordinates of each of the neighboring cells in a plurality of directions, such as the north, east, south, and west directions, with respect to the cell's distance from the center of the field of view of the image. Once these points are plotted, a linear regression line may be used to model the linear function between the cell's cardinal distances versus the cell's distance to the center of the field of view. An image having distortion aberrations will create a linear regression line that has a slope that is either substantially positive or negative. A barrel or pincushion like distortion would generate a negative and positive slope, respectively. In addition, the system may capture images with the same optical path such that if any significant distortion aberration was present, the distortion would be present in each of the images, and if necessary, precise image unwarping techniques, as is well-known in the art, could be applied to correct for this distortion.

According to one exemplary system, high end Plan Apo Achromat objectives, a Allied Vision Technology GE1910 camera, FocalPoint's Chessboard 100 pattern of the calibration plate, and images with region of interests that are smaller than a field of view may be used to limit the distortion. Distortion is mainly expected on edges of the field of view. Further, according to one embodiment of the present invention, the analyzed regions of interest may represent a central part of the field of view image and may roughly represent only one-third to one-half of the whole field of view image. A scatter plot and regression line using such a system, as shown in FIG. 5, illustrates a regression line having a slope of approximately 0.0001. Accordingly, this embodiment of the present invention limits distortion aberrations to an insignificant amount.

As previously mentioned, in order to solve chromogen separation equations derived from the Lambert-Beer law, a basic premise is that the same part of the object in the field of view should be examined. Thus, one advantageous aspect of the present invention is the correction of lateral chromatic aberration, which when observed, will provide a difference in magnification for light of different wavelengths due to the different focal lengths thereof. For instance, an image viewed under relatively short blue light wavelengths will appear larger than the same image viewed under relatively longer red length wavelengths. However, even after the plurality of images are corrected with the appropriate magnification factor from the process previously described, a pixel location in one image taken under one wavelength may not correspond to a pixel location in a second image taken under a different wavelength if the images are not aligned.

Referring again to exemplary embodiment of FIG. 3, images of the sample are captured by the system (Block 30), which scans the area or region of interest of the sample on the slide. Each image is transformed from transmittances into optical densities according to the Lambert-Beer law, as is well known in the art. In one embodiment, a calibration step may be used to capture a black reference image (B) and a white reference image (Io) for each of a plurality of wavelengths ($\lambda$). Each shading-corrected optical density image may be computed by transforming the transmittances of each pixel (x,y) captured at a given wavelength into the optical density of each pixel $OD_{xy\lambda}$ captured at the specific wavelength with the following formula:

$$OD_{xy\lambda} = N \times \log_{10}\left(\frac{I_{0_{xy\lambda}} - B_{xy}}{I_{xy\lambda} - B_{xy}}\right) \quad (3)$$

N is a multiplication factor depending upon the pixel depth of the images, which may be about 10,000 for a 16 bits per pixel image.

The system scans the sample fully with respect to one particular wavelength before scanning the sample again with respect to a differing wavelength. Therefore, images obtained for separate wavelengths of light may be adjusted to provide correlation with respect to the regions of the field of view where chromogen separation equations are subsequently employed to determine the amount of molecular species in a sample. Further, the plurality of images acquired from each of the scans of the object taken with respect to a specific wavelength may be aligned such that the pixel locations of an image captured at one wavelength correspond to pixel locations of an image captured at a different wavelength. According to one embodiment of the present invention, when scanning the area or region of interest of the sample on the slide, the system may produce displacement factors as each scan of the sample with respect to one wavelength is completed before scanning the system with respect to a different wavelength. As such, a scan completed under one wavelength may produce an image having a region of interest that is displaced from the corresponding region of interest of an image taken with respect to a different wavelength, the displacement being characterized by the displacement factor.

Accordingly, embodiments of the present invention provide a method of aligning each of the images scanned such that each pixel location of one image taken under one wavelength corresponds to a respective pixel location of an image taken under a differing wavelength, as shown in FIG. 3. Another embodiment of the invention provides a method of aligning each of the images scanned such that a region of interest of at least one of the images taken under one wavelength corresponds to a region of interest of at least one of the images taken under a different wavelength. After each image has been corrected by the appropriate magnification factor with respect to the central wavelength, the images may be aligned such that the pixel locations of each of the images correspond to the pixel locations of each of the images captured. One embodiment of the present invention provides for extracting a number of profiles in a plurality of different directions (e.g., horizontal and vertical profiles) from each of the plurality of images based on the background and object optical density to align the plurality of the images. Specifically, the horizontal and vertical profiles may be extracted from a first image to align a region of interest within the first image taken with respect to a reference or central wavelength with a region of interest within a second image taken with respect to a different wavelength. Furthermore, horizontal and vertical profiles may be extracted from each of the images to align the same region of interest from the reference image with the corresponding region of interest in the other images.

In one aspect of the present invention, a low-pass filter is applied (Block 31) to each of the images to reduce high frequency noise artifacts. According to one exemplary embodiment, the low-pass filter comprises a kernel, such as a square matrix having an equal number of rows and number of columns (e.g., a 3×3 kernel), with each element having a particular value equal to about the inverse of the product of the total number of rows and the total number of columns (e.g., +1/9 for a 3×3 kernel). Accordingly, when a 3×3 kernel is applied to a particular pixel, the center pixel and each of the eight neighboring pixels that surround the center pixel are added together and then divided by 9. The resulting value then replaces the value for the center pixel. This process may be repeated for each pixel within the image to create a filtered optical density image.

To extract the horizontal and vertical profiles from the image, a binarized image mask may be created from the shade-corrected image. A histogram detailing the optical densities of the pixels may be created (Block 32) based upon the shade-corrected optical density image, the histogram being constructed to binarize the shade corrected image to form a binarized image mask. Thus, according to one embodiment, the histogram is created based on the background peak statistics of each of the pixels. Where, for example, a 16-bit black-and-white camera 300 is used in the system 100, the light intensity transmitted through each of the pixels in each wavelength filter may be expressed as $2^{16}$ (=65536) values between 0 and 65535. Further, the optical density for each of the pixels may be calculated according to Lambert-Beer law and may be stored in a computer device 350 using a dynamic range of 16 bits. Accordingly, the histogram detailing the optical densities of each of the pixels will have a number of bins between 0 and 65535, as shown in FIG. 6. For example, the initial intensity $I_o$ of the light source 200, which corresponds to 100% transmittance, will preferably be expressed in each of plurality of wavelengths as a value approaching 65535, representing the brightest possible value in each wavelength, and a value of 0 after being converted from transmittance to optical density. Conversely, in the absence of light, generally corresponding to transmittance approaching 0%, a "black image" will have an intensity value approaching 0 in each of the wavelengths or the high end of the histogram after being converted to optical density.

Once the histogram detailing the background peak statistics of each of the pixels has been constructed, a threshold utilized for binarizing the image to create a binary image mask (Block 33) may be calculated based on the background mode and standard deviations. According to one embodiment, the mode is determined by the optical density background peak max found between the minimum bin and the minimum bin plus 4096. The standard deviation may be calculated based on the full width at half maximum. Specifically, in one embodiment, the standard deviation of the optical density histogram is calculated as the full width at half maximum (FWHM) divided by, for example, 2.35, as shown in the equation below.

$$StDev = \frac{FWHM}{2.35} \quad (4)$$

The full width at half maximum is calculated by adding the two distances between the mode (i.e., the background peak between the minimum bin and the minimum bin plus 4096) and the bins equaling, for example, 50% of the mode, as shown by the equation below and illustrated in FIG. 6.

$$FWHM = D_1 + D_2 \quad (5)$$

If one of the distances between the mode and the bin equaling 50% of the mode is, for instance, 1.2 times greater than the other distance between the mode and the other bin equaling 50% of the mode, the full width at half maximum value may be calculated as, for example, 2 times the smaller of the two distances, as shown by the equation below and illustrated in FIG. 6.

$$\text{If}(D_2 > 1.2 \cdot D_1): FWHM = 2 \cdot D_1 \quad (6)$$

Accordingly, as mentioned before, the standard deviation may then be calculated as the full width at half maximum divided by 2.35, and the threshold used to create the binarized image mask (Block 33) is calculated as the mode plus, for example, 6 times the standard deviation, as shown by the equation below.

$$\text{Threshold} = \text{Mode} + 6 \cdot \text{StDev} \quad (7)$$

In another embodiment, the threshold may be calculated as the mode plus at least 3 times the standard deviation.

The value of each of the pixels in the image may be then compared to the threshold to create the binary image mask. Those pixels having a value less than or equal to the threshold may be assigned a value of zero, while the pixels having a value greater than the threshold may be assigned a value of one. Accordingly, the image may then be converted into a binarized mask, each pixel within the image mask having a value or zero or one. According to one embodiment of the invention, the percentage of pixels having a value greater than the threshold in the reference image can be used to refine the threshold used to generate the binarized mask of the image to be realigned. Once the binary image mask is applied to each of the images, the horizontal and vertical profiles can be extracted for each of the images, the images corresponding to a differing wavelength. The horizontal and vertical profiles are extracted (Block 34) to align the region of interest from a portion of each of the images that are captured.

From the binarized image, the horizontal profiles extracted represent the vertical projection of the region of interest on the horizontal axis, as illustrated by FIG. 7. Likewise, the vertical profiles extracted represent the horizontal projection of the region of interest on the vertical axis. The number of horizontal profiles correlates to the number of pixels necessary to cover the tolerance in the displacement in the vertical direction, while the number of vertical profiles correlates to the number of pixels necessary to cover the tolerance in displacement in the horizontal direction. In one embodiment of the invention, the region of interest examined has a length and width of equal value. Accordingly, the horizontal profiles have a horizontal length equal to the size of the region plus two times a horizontal displacement factor. The horizontal displacement factor is equal to the mean horizontal displacement plus, for example, twelve standard deviations. Likewise, a vertical displacement factor is equal to the mean vertical displacement plus, for example, twelve standard deviations. Furthermore, the vertical profiles have a vertical length equal to the size of the region plus two times the vertical displacement factor.

Once the horizontal and vertical profiles are extracted for each of the plurality of images, the horizontal and vertical profiles for each of the images may be rescaled using spline functions. According to one embodiment of the invention, the horizontal coordinates of each of the horizontal and vertical profiles for each of the plurality of images are converted from coordinates defined by the number of pixels to coordinates defined in micrometers, as shown in the equation below.

$$X(\mu m) = [X(px) - X_{center}(px)] \cdot \text{pixelSize}(\mu m) + X_{center}(px) \quad (8)$$

The new horizontal coordinate value rescaled in micrometers, $X(\mu m)$, is equal to the original horizontal coordinate value in pixels, $X(pm)$, minus the horizontal coordinates of the reference point, such as the center of the image, in pixels, $X_{center}$ (pm), multiplied by the size of a pixel in micrometers, pixelSize($\mu m$) plus the horizontal coordinates of the reference point. According to one embodiment, the horizontal coordinate value of the reference point may equal zero.

The vertical coordinates of each of the horizontal and vertical profiles for each of the plurality of images may be rescaled by the spline functions (Block 35) to a new value so as to be related at least in part by the profile intensity. Specifically, the vertical coordinates of each of the horizontal and vertical profiles are rescaled according to the equation below.

$$Y\text{value} = \text{profileValue} \cdot \text{pixelSize}(\lambda) \div \text{pixelSize}(\lambda \text{ref}) \quad (9)$$

The new vertical coordinate value, $Y_{value}$, is equal to the average intensity of the pixel at the corresponding horizontal position, profileValue, multiplied by the size of the pixel at the corresponding wavelength, pixelSize($\lambda$), divided by the size of the pixel of the reference wavelength, pixelSize($\lambda_{ref}$). In one embodiment of the invention, the reference wavelength may be equal to 570 nm. The number of rescaled spline profiles may be equal to the number of profiles.

Once each of the horizontal and vertical profiles extracted from each of the plurality of images are rescaled according to the spline functions, embodiments of the present invention provide for evaluating the shift between spline profiles from the reference image with spline profiles for each of the plurality of images (Block 36). First, the spline profiles from a target image may be evaluated against the spline profiles from the reference image by calculating an error factor according to the equation below.

$$\text{Error} = \Sigma[P\lambda(dx, dy) - P\lambda \text{ref}(0,0)]^2 \quad (10)$$

The spline profile with the minimum amount of error best matches the reference profile. The error factor is equal to the sum of the square of the differences between the coordinates of the spline profile and the coordinates of the reference profile. The shift is evaluated for both the horizontal spline profiles and the vertical spline profiles. According to one embodiment of the invention, averaging the shifts between the spline profiles and the reference spline profiles provides a preferred precision to evaluate the shift between profiles. Furthermore, another embodiment may comprise extracting profiles from a plurality of regions of interests from the two images that are to be aligned and compared.

Once the spline profile with the least amount of error is determined, the target image may be aligned to the reference image (Block 37) by first rescaling the image with the previously determined magnification factor. The image may then be aligned to the reference image by shifting the image in the horizontal and vertical directions by the shift factors that were determined to provide the smallest amount of error. The magnification rescaling and corrective shifting in the horizontal and vertical direction may be applied to each of the plurality of spectral images with respect to the reference wavelength image. Once each of the plurality of spectral images have been rescaled and aligned with respect to the reference wavelength image, according to one embodiment of the invention, the system may then proceed with chromogen separation analysis of the sample (Block 40).

Particularly, the system may then proceed with determining an amount of a plurality of molecular species in a sample, each molecular specie being indicated by a dye. In one embodiment, the system may determine an amount of a plurality of molecular species by using chromogen separation techniques. Such a technique includes determining an optical density of the sample in each pixel at each corresponding pixel location in the plurality of images. In one embodiment, a corresponding optical density matrix is formed for that pixel and multiplied by the inverse of a relative absorption coefficient matrix so as to form a resultant matrix for the pixel. The relative absorption coefficient matrix comprises a relative absorption coefficient for each dye, independently of the sample, in each of the plurality of wavelengths. In one embodiment, the method may include refining the amount of a plurality of molecular species at one or more pixel locations in the plurality of images. Further, the system may comprise a video-microscopy system comprising an image acquisition device configured to capture a plurality of magnified digital images of the sample and a processor device configured to determine an amount of each molecular specie. For further exemplary discussion regarding techniques for determining the amount of a molecular species in a sample, see U.S. Patent Application No. 61/474,250, entitled METHOD FOR OPTIMIZATION OF QUANTITATIVE VIDEO-MICROSCOPY AND ASSOCIATED SYSTEM, which was filed on Apr. 12, 2012 and is incorporated in its entirety herein.

According to the methodology described herein, the determined dye concentrations may then be used to reconstruct an artificial image of the sample. The artificial images may be generated as a substantially real time or live image, or as a still image, using combinations of the dyes comprising a marker and/or a counterstain used to prepare the sample. More particularly, an artificial image of the field of view may be produced which shows the sample as affected by all of the dyes, the sample as affected by one or more marker dyes, or the sample as affected by the counterstain. Consequently, since the dyes used to prepare the sample are characterized by the system, the capabilities of the system may be extended such that, for instance, the sample or field of view may be automatically scanned to detect a specific region of interest as identified by the characteristics of a particular dye or to affect or facilitate a task to be performed on that specific region of interest.

Still further, the artificial image of the field of view may also be used to facilitate the identification and extraction of selected features of the treated sample. For example, marked point processes, contextual analysis, and/or geo-statistics may be used to identify and extract features from the image based on, for instance, a spatial distribution analysis of a particular dye. Such a feature extraction capability would also allow, for example, fields of view or objects of interest to be sorted, flagged, or otherwise identified or grouped based on, for instance, the overall content of a given marker dye or a selected ratio of particular marker. Where, for example, a threshold criteria can be established, such a capability would be the detection of rare, worsening, or other serious events. Proceeding further, classifiers based specifically on the image processing resulting from the counterstain and/or marker dye specific images may then be established and used to evaluate the presence of certain cell types or to perform a diagnosis based upon the field of view. For example, HER2 may be evaluated in this manner by comparison to a continuous diagnosis scale established according to the system and methods described herein. Such classifiers may usually also encompass other informative features such as, for example, detail based upon the morphology or the texture of the cells.

It will be understood that the methodology and procedures detailed herein in conjunction with the system 100 specify a method of calibrating or otherwise preparing a video-microscopy system for acquiring and analyzing images of a sample. One skilled in the art will also appreciate that such a method may be automated so as to provide a computer software program product, executable on a computer device, having executable portions capable of determining a magnification factor and aligning the plurality of images. Accordingly, embodiments of the present invention describe the implementation of a method and/or corresponding computer software program product which may be accomplished in appropriately configured hardware, software, or a combination of hardware and software in accordance with the scope of the present invention. Thus, embodiments of the present invention comprise a preparation technique for a video-microscopy system for analyzing prepared samples that may provide effective detection and quantification of species of interest that overcomes limiting factors of prior art technologies, such as errors in dye concentration estimations due to noise fluctuations, improper calibration, and/or chromatic aberrations.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of calibrating an imaging system for analyzing a plurality of molecular species in a sample, said method comprising:

acquiring a plurality of images of the sample with an image acquisition device at a plurality of different wavelengths by scanning the image at a plurality of different wavelengths, each scan producing a displacement factor in a first and second direction, the displacement factor defining the difference in displacement between a region of interest of an image taken with respect to one wavelength and a region of interest of an image taken with respect to a different wavelength;

comparing a region of interest associated with at least one of the images acquired at one respective wavelength to a region of interest associated with at least one of the images acquired at a different wavelength to determine the displacement factors among the images; and aligning the plurality of images using the displacement factors such that the region of interest associated with at least one of the images acquired at one respective wavelength corresponds to the region of interest associated with the at least one of the images acquired at the different wavelength.

2. A method according to claim 1 further comprising determining a magnification factor for each of a plurality of wavelengths from a reference image, wherein the magnification factor characterizes the difference in magnification between one image taken with respect to one wavelength and another image taken with respect to a different wavelength.

3. A method according to claim 2 wherein determining a magnification factor comprises:

capturing a defocused image of a calibration slide in each of the plurality of wavelengths, the calibration slide comprising a lattice of a plurality of cells arranged in an alternating pattern, each cell further comprising a plurality of pixels;

determining a shading of each of the plurality of pixels so as to form a mask for discriminating between a percentage of the lightest pixels and an equal percentage of the darkest pixels;

determining an area for each of a plurality of cells;

determining a center for each of a plurality of cells;

measuring a distance between the centers of each of the plurality of cells; and refining the measurements of the areas for each of the plurality of cells and the measurements of the distances between the centers of each of the plurality of cells.

4. A method according to claim 3, wherein the defocused image is generated by applying a low pass filter to a focused image of a calibration slide.

5. A method according to claim 3, wherein the defocused image is generated by adjusting the focus plane in the positive or negative z-axis.

6. A method according to claim 3, wherein measuring the distance between the centers of each of the plurality of cells comprises measuring the distance in each of the north, east, south, and west directions between a center of a cell and a center from each of a neighboring cell in the north, east, south, and west directions.

7. A method according to claim 3, wherein measuring the distance between the centers of each of the plurality of cells further comprises:

determining a mean and a standard deviation of the distance between the centers of the plurality of cells; and refining a mean of a plurality of distances between the centers of the plurality of cells by excluding the distances between the centers of the plurality of cells that fall outside a confidence interval from the mean calculation.

8. A method according to claim 3, wherein determining the areas for each of the plurality of cells further comprises:

determining a mean and a standard deviation of the areas for each of the plurality of cells; and refining a mean of a plurality of areas of the plurality of cells by excluding the areas that fall outside a confidence interval from the mean calculation.

9. A method according to claim 3, wherein refining the measurements further comprises:

displacing the calibration slide in a random direction;

capturing a defocused image of the displaced calibration slide;

determining a shading of each of the plurality of pixels in the displaced calibration slide so as to form a mask for discriminating between a percentage of the lightest pixels and an equal percentage of the darkest pixels;

determining an area for each of a plurality of cells in the displaced calibration slide; determining a center for each of a plurality of cells in the displaced calibration slide; and measuring a distance between the centers of each of the plurality of cells.

10. A method according to claim 9, wherein refining the measurements further comprises:

displacing the calibration slide in a random direction a plurality of times;

capturing a defocused image of the displaced calibration slide each of the plurality of times the slide is displaced;

determining a shading of each of the plurality of pixels in each of the displaced calibration slides so as to form a mask for discriminating between a percentage of the pixels having the lightest shading and an equal percentage of the pixels having the darkest shading;

determining an area for each of the plurality of cells in each of the displaced calibration slides;

determining a center for each of the plurality of cells in the displaced calibration slides; and measuring the distances between the centers of each of the plurality of cells in the displaced calibration slides.

11. A method according to claim 1, wherein comparing a region of interest further comprises:

transforming the plurality of images into shading-corrected optical density images; applying a low-pass filter to each of the plurality of images;

determining a plurality of optical density histograms from each of the images;

binarizing the plurality of images according to a threshold from each of the respective histograms so as to form a mask for discriminating between negative and positive regions in each of the images;

determining a plurality of profile areas for each of the images from each respective binarized image mask, the plurality of profile areas configured to at least represent the region of interest selected for comparison;

rescaling the coordinates of the plurality of profile areas according to a spline function; and determining a shift between the plurality of images with respect to a reference image.

12. A method according to claim 11, wherein applying a low pass filter comprises applying a low pass filter on the image with a kernel.

13. A method according to claim 12, wherein the kernel comprises a square matrix with an equal number of rows and columns, wherein the elements of the square matrix comprise values equal to the multiplicative inverse of the product of the total number of rows and the total number of columns.

14. A method according to claim 11, wherein the threshold from each of the respective histograms comprises a value defined by the mode plus at least one standard deviation of the respective histograms.

15. A method according to claim 14, wherein the mode of each respective histogram comprises a value defined by the peak max found between a range of values of the optical density for each of a plurality of pixels for each respective histogram.

16. A method according to claim 14, wherein the standard deviation of each respective histogram is defined in part by a value of full width at half maximum of each respective histogram.

17. A method according to claim 11, wherein the plurality of profile areas further comprise profile areas oriented in a horizontal and vertical fashion with respect to each of the plurality of images, the plurality of images each comprising a region of interest.

18. A method according to claim 17, wherein the plurality of horizontal profile areas further comprise a horizontal profile width, the horizontal profile width defined in part by a horizontal displacement factor, the horizontal displacement factor defined by the mean horizontal relocation error displacement plus or minus at least one standard deviation of the mean of the horizontal relocation error displacement.

19. A method according to claim 18, wherein the number of horizontal profile areas are defined in part by a vertical displacement factor, the vertical displacement factor defined by the mean vertical relocation error displacement plus or minus at least one standard deviation of the mean of the vertical relocation error displacement.

20. A method according to claim 18, wherein the plurality of vertical profile areas further comprise a vertical profile height, the vertical profile height defined in part by the vertical displacement factor.

21. A method according to claim 18, wherein the number of vertical profile areas are defined in part by the horizontal displacement factor.

22. A method according to claim 11, wherein resealing the coordinates further comprises resealing horizontal coordinates of the horizontal and vertical profile areas, the horizontal coordinates relating to a difference between a horizontal pixel position and a center pixel position.

23. A method according to claim 11, wherein resealing the coordinates further comprises resealing the vertical coordinates of the horizontal and vertical profile areas, the vertical coordinates relating to an average optical intensity at a particular horizontal position and the related wavelength of the image.

24. A method according to claim 11, wherein determining a shift between the plurality of images further comprises determining the difference in displacement between the horizontal and vertical reference profile areas to the horizontal and vertical profile areas determined for each of the plurality of images.

25. A method according to claim 11, further comprising averaging a plurality of displacement measurements taken from a plurality of horizontal and vertical profile areas of an image, each image further comprising multiple regions of interests.

26. A method according to claim 1, wherein aligning the plurality of images further comprises aligning a plurality of profile areas from each of the images with a plurality of profile areas of a reference image.

27. A method according to claim 26, wherein aligning the plurality of images further comprises:
    resealing the image by a magnification factor; and
    shifting the resealed image in a horizontal and vertical direction.

28. A method according to claim 1 further comprising determining an amount of molecular specie, as indicated by a respective dye, for each pixel at each corresponding pixel location in the plurality of images.

29. An imaging system for analyzing an amount of a plurality of molecular species in a sample, said system comprising:

an image acquisition device configured to acquire a plurality of images of the sample at differing wavelengths by scanning the images, each scan producing a displacement factor in a first direction and in a second direction, the displacement factor defining the difference in displacement between a region of interest of an image taken with respect to one wavelength and a region of interest of an image taken with respect to a different wavelength; and a processor device in communication with the image acquisition device and configured to:

compare a region of interest associated with at least one of the images acquired at one respective wavelength to a region of interest associated with at least one of the images acquired at a different wavelength to determine the displacement factor between the images; and align the plurality of images captured by the imaging system using the displacement factor such that the region of interest associated with at least one of the images acquired at one respective wavelength corresponds to the region of interest associated with the at least one of the images acquired at the different wavelength.

30. A system according to claim 29, wherein the processor device is further configured to determine an amount of each molecular specie, as indicated by a respective dye, for each pixel in the plurality of images.

31. A system according to claim 29, wherein the processor device is further configured to determine a magnification factor for each of the plurality of wavelengths from a reference image.

32. A system according to claim 30, wherein the amount of a plurality of molecular species is determined by the concentration of a dye present at a corresponding pixel location.

33. A system according to claim 29, wherein the image acquisition device comprises a black and white camera.

34. A system according to claim 29, wherein the image acquisition device comprises a plurality of filters, each filter corresponding to a different wavelength representative of a respective dye in the sample.

35. A system according to claim 30, wherein the processor device is further configured to determine the concentration of a dye present in each pixel at each corresponding pixel location.

36. A non-transitory computer-readable medium encoded with a computer program for calibrating an imaging system for determining an amount of a plurality of molecular species in a sample, said computer-readable medium encoded with a computer program being executable on a computer device and comprising:

an executable portion for acquiring a plurality of images of the sample with an image acquisition device at a plurality of different wavelengths wherein the image acquisition is by scanning the images, each scan producing a displacement factor in a first direction and a second direction, the displacement factor defining the difference in displacement between a region of interest of an image taken with respect to one wavelength and a region of interest of an image taken with respect to a different wavelength for aligning the plurality of images;

an executable portion for comparing a region of interest associated with at least one of the images acquired at one respective wavelength to a region of interest associated with at least one of the images acquired at a different wavelength and determining the displacement factor between the images; and an executable portion for aligning the plurality of images using the displacement factor such that the region of interest associated with at least one of the images acquired at one respective wavelength corresponds to a region of interest associated with the at least one of the images acquired at the different wavelength.

* * * * *